United States Patent [19]
Hayashi et al.

[11] Patent Number: 5,396,631
[45] Date of Patent: Mar. 7, 1995

[54] COMPILING APPARATUS AND A COMPILING METHOD

[75] Inventors: Masakazu Hayashi; Yutaka Igarashi; Masaaki Takiuchi; Kohichiro Hotta, all of Kawasaki, Japan

[73] Assignee: Fujitsu Limited, Kawasaki, Japan

[21] Appl. No.: 113,810

[22] Filed: Aug. 31, 1993

[30] Foreign Application Priority Data

Mar. 1, 1993 [JP] Japan .................. 5-039841

[51] Int. Cl.⁶ .................. G06F 9/45
[52] U.S. Cl. .................. 395/700; 364/DIG. 1; 364/280.5
[58] Field of Search .................. 364/DIG. 1 MS File; 395/700

[56] References Cited

U.S. PATENT DOCUMENTS

| | | | |
|---|---|---|---|
| 4,667,290 | 5/1987 | Goss et al. | 395/700 |
| 4,763,255 | 8/1988 | Hopkins et al. | 395/700 |
| 5,146,594 | 9/1992 | Iitsuka | 395/700 |
| 5,193,190 | 3/1993 | Janczyn et al. | 395/700 |
| 5,212,794 | 5/1993 | Pettis et al. | 395/700 |
| 5,293,631 | 3/1994 | Rau et al. | 395/700 |

FOREIGN PATENT DOCUMENTS 2-81137 3/1990 Japan .

OTHER PUBLICATIONS

Computing Practices, *A Practical Tool Kit for Making Portable Compilers*, Andrew S. Tanenbaum et al., pp. 1–7, Apr. 1993.

*Primary Examiner*—Thomas M. Heckler
*Attorney, Agent, or Firm*—Staas & Halsey

[57] ABSTRACT

A compiling apparatus has a front end for providing intermediate representations according to a source program; an optimizing unit for optimizing the intermediate representations; an intermediate representation changing unit for changing the optimized intermediate representations; and a code output unit for providing code according to the lastly obtained intermediate representations. The compiling apparatus further has an optimizing structure determination unit for determining the number of repetitions of an optimization phase achieved by the optimizing unit and intermediate representation changing unit and selecting optimization functions carried out in each of the optimization phases. The intermediate representations are changed and optimized in each optimization phase according to the determination by the optimizing structure determination unit.

22 Claims, 19 Drawing Sheets

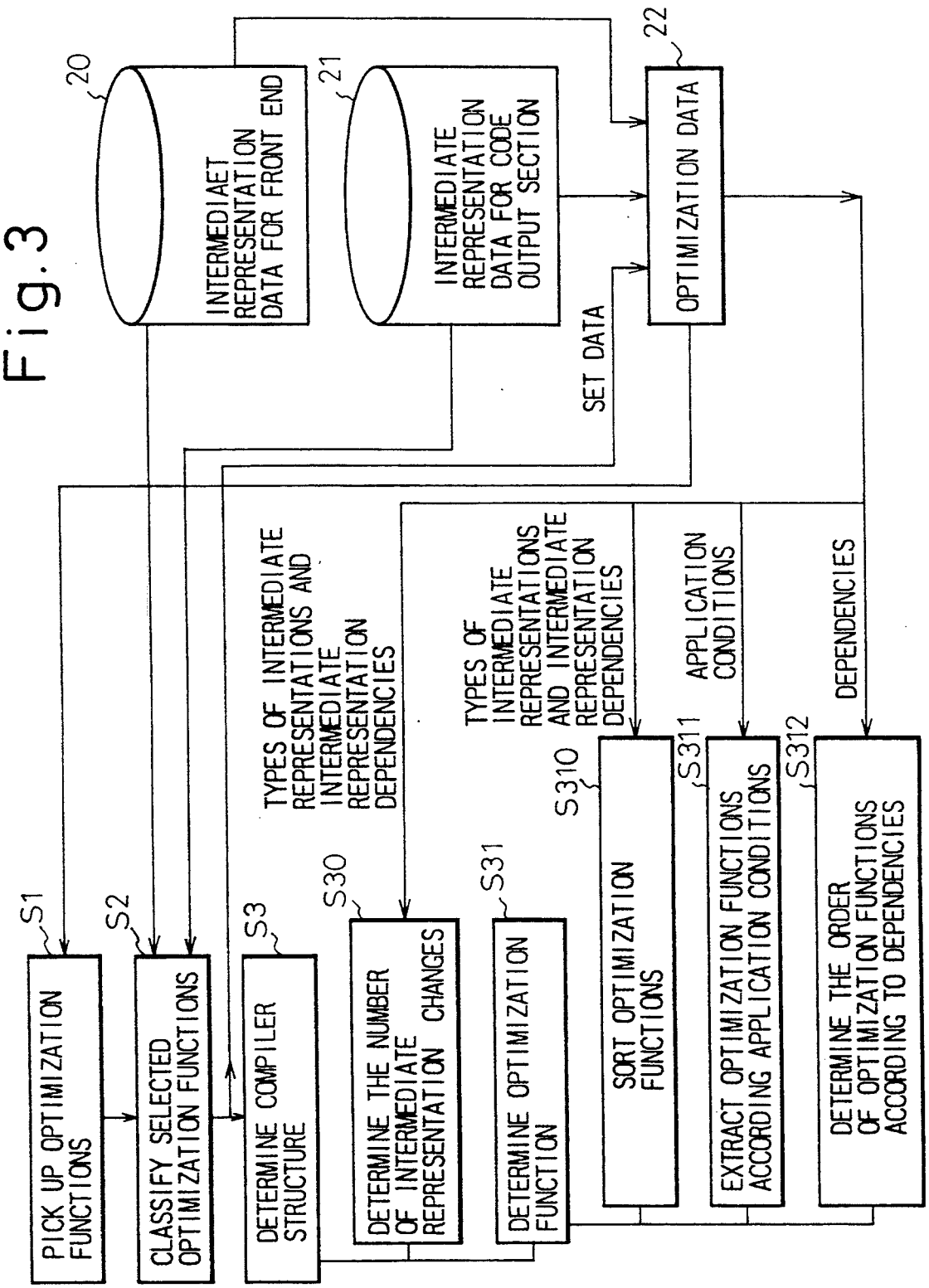

Fig.4(A)

```
--
TYPE: LINDA (Generic)
CODE (OPERATOR): LOAD
DATA TYPE:  i1, i2, i4, u1, u2, u4, r4, r8, r16, c8, c16, c32
OPERANDS
       1: std, prg
       2: axd, bxd, var
CONDITIONS
       BOUNDARY: X (Unguaranteed)
       ADDRESS REPRESENTATION: 3
--
TYPE: LINDA (Generic)
CODE (OPERATOR): ADD
DATA TYPE:  i1, i2, i4, u1, u2, u4, r4, r8, r16, c8, c16, c32
OPERANDS
       1: std, prg, var
       2: axd, bxd, var
       3: std, prg, var, cnt
CONDITIONS
       CONSTANT RANGE: X (Unlimited)
--
TYPE: LINDA (Generic)
CODE (OPERATOR): cmove
DATA TYPE:  char
OPERANDS
       1: axd, bxd
       2: axd, bxd
CONDITIONS
--
```

Fig.4(B)

```
--
TYPE: LINDA (Generic)
CODE (OPERATOR): LOAD
DATA TYPE: i1, i2, i4, u1, u2, u4, r4, r8
OPERANDS
    1: std, prg
    2: axd, bxd
CONDITIONS
    BOUNDARY: axd, bxd (Boundaries for axd and bxd must be
guaranteed.)
    ADDRESS REPRESENTATION: 2 (Memory address with two values)
--
TYPE: LINDA (Generic)
CODE (OPERATOR): ADD
DATA TYPE: i1, i2, i4, u1, u2, u4, r4, r8
OPERANDS
    1: std, prg
    2: std, prg
    3: std, prg, cnt
CONDITIONS
    CONSTANT RANGE:  -1095<=cnt<=4095
                   : cmove has been elimidated.
```

Fig. 5

○ : Supported

| No | Optimization Function | MPA | MPB | SCH |
|---|---|---|---|---|
| 1 | Constant Folding | ○ | ○ | |
| 2 | Constant Propagation | ○ | ○ | |
| 3 | Copy Propagation | ○ | ○ | |
| 4 | Common Subexpression Elimination | ○ | ○ | |
| 5 | Dead Code Elimination | ○ | ○ | |
| 6 | Array/Subscript Optimization | ○ | | |
| 7 | Invariant Expression Motion | ○ | ○ | |
| 8 | Strength Reduction | ○ | | |
| 9 | Test Replacement | ○ | | |
| 10 | Simple Store Elimination | ○ | ○ | |
| 11 | Parallel Induction Variable Elimination | ○ | | |
| 12 | Localization of Subscript Computation | ○ | | |
| 13 | Replacing Array-element with simple Variable | ○ | | |
| 14 | User Function Inline Expansion | ○ | | |
| 15 | Tail Recursion | ○ | | |
| 16 | Inner Loop Unrolling | ○ | | |
| 17 | Struct/Union Member Optimization with Aliasing Analysis | ○ | | |
| 18 | Global Register Allocation | | ○ | |
| 19 | Leaf Routine Optimization | | ○ | |
| 20 | Peephole Optimization | ○ | ○ | |
| 21 | Branch Optimization<br>1) Code Straightening<br>2) Block Reordering<br>4) Branch to Branch Removal | ○<br>○<br>○ | ○<br>○<br>○ | |
| 22 | Instruction Scheduling | | | ○ |

Fig. 6(A)

```
—
ENTRY No.: 1
OPTIMIZATION NAME: constant folding
APPLICABLE TYPE OF INTERMEDIATE REPRESENTATION: LINDA
     OPERATOR: * (Don't care.)
     OPERANDS: cnt
INTERMEDIATE REPRESENTATION DEPENDENCIES:
     CONSTANT RANGE: *
APPLICATION CONDITIONS:
     Times: -
DEPENDENCIES:
     -

—
ENTRY No.: 4
OPTIMIZATION NAME: CSE
APPLICABLE TYPE OF INTERMEDIATE REPRESENTATION: LINDA
     OPERATOR: *
     OPERANDS: std, prg, var, cnt
INTERMEDIATE REPRESENTATION DEPENDENCIES:
     CONSTANT RANGE: * (Don't care)
     BOUNDARY: X
     ADDRESS: *
APPLICATION CONDITIONS:
     Times: -
DEPENDENCIES:
     -

—
ENTRY No.: 14
OPTIMIZATION NAME: User Function Inline
FUNCTION NAME:
APPLICABLE TYPE OF INTERMEDIATE REPRESENTATION: LINDA
     OPERATOR: *
     OPERANDS: *
INTERMEDIATE REPRESENTATION DEPENDENCIES
APPLICATION CONDITIONS:
     Times: 1
DEPENDENCIES:
     Before 1, 2, ..., 13, 15, ..., 22
```

Fig. 6 (B)

```
--
ENTRY No.: 16
OPTIMIZATION NAME:  Inner Loop Unrolling
APPLICABLE TYPE OF INTERMEDIATE REPRESENTATION:  LINDA
     OPERATOR:  *
     OPERANDS:  *
INTERMEDIATE REPRESENTATION DEPENDENCIES:
APPLICATION CONDITIONS:
     Times:  1
DEPENDENCIES:
     After: 14, 1, 2, ...
--
ENTRY No.: 18
OPTIMIZATION NAME:  Global register allocation
APPLICABLE TYPE OF INTERMEDIATE REPRESENTATION:  LINDA
     OPERATOR:  *
     OPERANDS:  *
INTERMEDIATE REPRESENTATION DEPENDENCIES:
     CONSTANT RANGE:  * (Don't care)
     BOUNDARY:  X
     ADDRESS:  2
APPLICATION CONDITIONS:
     Times:  1
DEPENDENCIES:
     Before: 22
     After: 1, 2, 3, 4, ..., 17, 19, ..., 21
--
ENTRY No.: 22
OPTIMIZATION NAME:  Instruction Scheduling
APPLICABLE TYPE OF INTERMEDIATE REPRESENTATION:  LINDA
     OPERATOR:  *
     OPERANDS:  *
INTERMEDIATE REPRESENTATION DEPENDENCIES
     CONSTANT RANGE:  * (Don't care.)
     BOUNDARY:  bxd, axd
     ADDRESS:  2
APPLICATION CONDITIONS:
     Times:  1
DEPENDENCIES:
     Before: 6
     After: 1, 2, 3, 4, ...
```

Fig. 7(A)

Table of intermediate representations

```
struct SET_IML {
        IML_TYPE    Type of intermediate representation;
        CODE_TYPE   Operation code
        LIST        List of types
        LIST        List of operands (n)
        struct      Conditions {
                NUMBER address;
                RANGE const;
                FLAGS boundary:
        }
}
```

Fig. 7(B)

Data structure of table of optimization function

```
struct OPTIMIZE_TBL  {
      NUMBER      Optimization function number
      NAME        Optimization function name
      IML_TYPE    Type of intermediate representation
      LIST        List of applied operators
      LIST        List of applied operands
      struct cond_tag  {
            NUMBER address;
            RANGE const;
            FLAGS boundary;
                 :
      }
      struct opt_cond_tag  {
            NUMBER times;
      }
      List Before;
      List After;
}
```

Fig.9

A SOURCE PROGRAM AND THE OPERATIONS OF A COMPILER
ACCORDING TO AN EMBODIMENT OF THE PRESENT INVENTION

```
     struct aaa {
        int    ii,jj;
        double fd;
     } s_1,S_2;

double zz [100] , xx;

void sub(n,x)
     int n;
     double x;
     {
        double          dd [100];
        int             i;

s_1 = s_2;
        for (i = 0 ; i < n ; i++)
         {
            dd [i] = dd [i] + (xx+ x) = zz [i] ;
/*          s_1.ii = s_1.ii - s_1.jj; */
         }
        sub1(dd);
        return;
     }
```

Fig.10

FRONT-END OUTPUTS OF THE EMBODIMENT label_1:
  cmove    axd:struct:("s 1") [0,0] axd("s 2") [0,0]

label_2:
  move    var:("i") cnt:0
  bge     #label_9 var("i") var("n")

label_6:
  mult    std#17d784 var("i") cnt:8
  load    std#17d7e8 axd("dd") [0, std:#17d784]
  add     std:#17d820 var:("xx") var:("x")
  mult    std:#17d858 var:("i") cnt:8
  load    std:#17d8bc axd("zz") [0 std:#17d858]
  mult    std:#17d8f4 std:#17d820 std:#17d8bc
  mult    std:#17d92c var:("i") cnt:8
  add     std:#17d990 std:#17d7e8 std:#17d8f4
  store   axd("dd") [0, std:#17d92c] std:#17d990
  load    std:#17da74 axd("s_1") [0]
  load    std:#17dad8 axd("s_1") [4]
  sub     std:#17db3c std:#17da74: std:#17dad8
  store   axd("s_1") [0] std:#17db3c:(i4)

label_7:
  move    std:#17dc80 var:("i")
  add     var:("i") std:#17dc80 cnt:1
  bit     #label_6 var:("i") var:("n")

label_9:
  raturn

Fig.11

OUTPUTS OF OPTIMIZATION A OF THE EMBODIMENT

```
#label_1:
   cmove   axd:struct:("s_1") [0,0] axd ("s_2")
                              [0,0]
#label_2:
   move    prg:#17cddc axd("i")     cnt:0
   add     std:#183f6c cnt:1 var:("n")
   sub     prg:#1849b0 std:#183f6c cnt:1
   bge     #label_9 cnt:0 var:("n")

#label_10:
   add     prg:#17d818 var:("xx") var:("x")
   move    prg:#184354 cnt:0
   shftrl  prg:#183f54 prg:#1849b0 cnt:1
   and     std:#1849e8 prg:#1849b0 cnt:0
   beq     #label_3 std:#1849e8 cnt:0 label_11:
   load    std:#184b00 axd("dd")  [0  prg:#184354]
   load    std:#184b84 axd("zz")  [0  prg:#184354]
   mult    std:#184be0 prg:#17d818 std:#184b84
   add     std:#184c40 std:#184b00 std:#184be0
   store   axd:("dd")  [0  prg:#184354] std:#184c40 load    std:#184d7c axd("s_1")  [0]
   load    std:#184e00 axd("s_1")  [4]
   sub     std:#184e5c std:#184d7c std:#184e00
   store   axd:struct:("s_1") [0] std:#184e5c add     prg:#184354 prg:#183f5c cnt:8
   beq     #label_9 prg:#183f5c cnt:0

;  #label_3:
;  #label_6:
   load    std:#17d7e0 axd("dd")  [0  prg:#184354]
   load    std:#17d8b4 axd("zz")  [0  prg:#184354]
   mult    std:#17d8ec prg:#17d818 std:#17d8b4
   add     std:#17d988 std:#17d7e0 std:#17d8ec
   store   axd("dd")  [0  prg:#184354] std:#17d988 load    std:#17da6c axd("s_1")  [0]
   load    std:#17dad0 axd("s_1")  [4]
   sub     std:#17db34 std:#17da6c std:#17dad0
   store   axd:("s_1")[0] std:#17db34 load    std:#185044 axd("dd")  [8  prg:#184354]
   load    std:#1850a4 axd("zz")  [8  prg:#184354]
   mult    std:#185100 prg:#17d818 std:#1850a4
   add     std:#185160 std:#185044 std:#185100
   store   axd:("dd")  [8  prg:#184354] std:#185160 load    std:#185278 axd("s_1")  [0]
   load    std:#1852fc axd("s_1")  [4]
   sub     std:#185358 std:#185278 std:#1852fc
   store   axd:("s_1")[0] std:#185358

;  #label_7:
   sid     none    sib:#17d9e8:line 22 (0)
   add     prg:#184354 prg:#183f5c cnt:#185404:i4:16
   gub     prg:#183f5c prg:#1854bc:i4:1
   bgt     #label_6 prg:#183f5c cnt:#185460:i4:0

;  #label_9:
   return  none
```

Fig.12

INTERMEDIATE REPRESENTATIONS AFTER INTERMEDIATE REPRESENTATION CHANGE (IE1) OF THE EMBODIMENT (PART 1)

```
#label_0:
  entry    prg:#18fe28 prg:#18feac prg:#18ff5c
  store    bxd:("n") [%fp+68] prg:#18fe28
  store    bxd:(ted:#1704b8) [%fp+72] prg:#18feac
  store    bxd:(ted:#1704b8 [%fp+76] prg:#18ff5c label_1:
  movehi   std:#18fffc adc:var:("s_1")+0
  or       std:#18fa8c std:#18fffc adc:("s_1")+0
  movehi   std:#1900b4 abc:("s_2")+0
  or       std:#18fae4 std:#1900b4 adc:("s_2")+0
  add      prg:#19016c std:#18fa8c cnt:0
  add      prg:#190190 std:#18fae4 cnt:0
  move     prg:#1901dc cnt:16 label_14:
  sub      prg:1901dc prg:#1901dc cnt:1
  load     std:#1904a0 bxd:("s_2") [prg:#190190] +0 prg:#1901dc]
  store    bxd:("s_1") [prg:#19016c] +0 prg:#1901dc] std:#1904a0
  cmp      prg:#18fdc8 prg:#1901dc cnt:0
  bne      #label_14(00190304) prg:#18fdc8 label_2:
  load     std:#190e8c bxd:("n") [%fp+68]
  add      prg:#183e3c std:#190e8c cnt:1
  sub      prg:#1847d4 std:#183e3c cnt:1
  load     std:#190f2c bxd:("n") [%fp+68]
  cmp      prg:#1904e8 std:#190f2c cnt:0
  ble      #label_9 prg:#1904e8 label_10:
  movehi   std:#191000 adc:("XX")+0
  load     std:#190ff0 bxd:("XX") [std:#191000] +0 adc("XX"/9)+0]
  load     std:#1910e0 bxd:("X") [%fp+72]
  add      prg:#17d818 std:#190ff0 std:#1910e0
  move     prg:#184188 cnt:0
  srl      prg:#183e2c prg:#1847d4 cnt:1
  and      std:#18480c prg:#1847d4 cnt:1
  cmp      prg:#1904e8 std:#18480c cnt:0
  beq      #label_3 prg:#1904e8
```

Fig.13

INTERMEDIATE REPRESENTATIONS AFTER INTERMEDIATE REPRESENTATION
CHANGE (IE1) OF THE EMBODIMENT (PART 2)

```
#label_11:
    add      std:#1902e4 var:(%fp) prg:#184188
    load     std:#184924 bxd:("dd") [std:#1902e4] +-800]
    movehi   std:#19126c adc:("zz"/6)+0
    or       std:#190340 std:#19126c adc("zz")+0
    load     std:#1849a8 bxd:("zz") [std:#190340] +0 prg:#184188]
    mult     std:#184a04 prg:#17d818 std:#1849a8
    add      std:#184a64 std:#184924 std:#184a04
    store    bxd("dd") [std:#1902e4] +-800] std:#184a64 add      prg:#184188 prg:#184188 cnt:#1701cc:i4:8
    cmp      prg:#1904e8 prg:#183e2c cnt:#1700fc:i4:8
    beq      #label_9 prg:#1904e8 label_3:
    add      prg:190198 var(%fp) prg:#184188 label_6:
    load     std:#17d7e0 bxd("dd") [prg:#190198] +-800]
    movehi   std:#191480 adc("zz")+0
    or       std:#18fd80 std:#191480 adc("zz")+0
    load     std:#17d8b4 bxd:("zz") [std:#18fd80] +0 prg:#184188]
    mult     std:#17d8ec prg:#17d818 std:#17d8b4
    add      std:#17d988 std:#17d7e0 std:#17d8ec
    store    bxd:("dd") [prg:#190198] +-800] std:#17d988
    load     std:#184c4c bxd("dd") [prg:#190198] +-792]
    movehi   std:#191620 adc("zz")+0
    or       std:#18fe98 std:#191620 adc("zz")+0
    add      std:#18fef4 std:#18fe98 prg:#184188
    load     std:#184cac bxd("zz") [std:#18fef4] +8]
    mult     std:#184d08 prg:#17d818 std:#184cac
    add      std:#184d68 std:#184c4c std:#184d08
    store    bxd("dd") [prg:#190198] +-792] std:#184d68 label_7:
    add      prg:#184188 prg:#184188 cnt:16
    add      prg:#190198 prg:#190198 cnt:16
    sub      prg:#183e2c prg:#183e2c cnt:1
    cmp      prg:#1904e8 prg:#183e2c cnt:0
    bgt      #label_6 prg:#1904e8 label_9:(0017dc04) /epi/term
    return   none
```

Fig. 14

OUTPUTS AFTER OPTIMIZATION B OF THE EMBODIMENT (PART 1)

```
#label_0:
    entry    prg:#18fe28 prg:#18feac prg:#18ff5c
    store    bxd:("n")  [%fp+68] prg:#18fe28
    store    bxd:(ted:#1704b8)  [%fp+72] prg:#18feac
    store    bxd:(ted:#1704b8)[%fp+76] prg:#18ff5c label_1:
    movehi   std:#18fffc adc:var:("s_1")+0
    or       std:#18fa8c std:#18fffc adc:("s_1")+0
    movehi   std:#1900b4 abc:("s_2")+0
    or       std:#18fae4 std:#1900b4 adc:("s_2")+0
    add      prg:#19016c std:#18fa8c cnt:0
    add      prg:#190190 std:#18fae4 cnt:0
    move     prg:#1901dc cnt:16 label_14:
    sub      (prg:#190904 prg:#1904f0) prg:#190904 cnt:#17ce38:u4:1
    load     std:#190bc8 bxd:("s_2")  [prg:#1908b8] +0 prg:#190904]
    store    bxd:("s_1") [prg:#190894] +0 prg:#190904] std:#190bc8
    bne      #label_14 prg:#1904f0 label_2:
    add      std:#183e44  prg:#190550 cnt:1
    sub      prg:#1847dc std:#183e44 cnt:1
    cmp      prg:#1904f0 prg:#190550 cnt:0
    ble      #label_9 prg:#1904f0 label_10:
    movehi   std:#191003 adc:("XX")+0
    load     prg:#1924c0 bxd:("XX")  [std:#191008] +0 adc("XX")+0]
    load     std:#1910e8 bxd:("X") [%fp+72]
    add      prg:#17d820 prg:#1924c0 std:#1910e8
    move     prg:#184190 cnt:0
    srl      prg:#183e34 prg:#1847dc cnt:1
    and      (std:#184314,prg:#1904f0) prg:#1847dc cnt:#170130:14:1
    beq      #;label_3 prg:#1904f0 label_11(00184638)
    add      std:#1902ec var(%fp) prg:#184190
    load     std:#18492c bxd("dd") [std:#1902ec] +-800]
    movehi   std:#191274 adc:("zz")+0
    or       std:#190348 std:#191274 adc("zz")+0
    load     std:#1849b0 bxd("zz") [std:#190348] +0 prg:#184190]
    mult     std:#184a0c prg:#17d820 std:#1849b0
    add      std:#184a6c std:#18492c std:#184a0c
    store    bxd("dd") [std:#1902ec] +-800 std:#184a6c add      prg:#184190 prg:#184190 cnt:8
    cmp      prg:#1904f0 prg:#183e34 cnt:0
    beq      #label_9(0017d39c) prg:#1904f0
```

Fig.15

OUTPUTS AFTER OPTIMIZATION B OF THE EMBODIMENT (PART 2)

```
#label_3(0017d2e8)
  add      prg:#1901a0 var(%fp) prg:#184190
  movehi   std:#191488 adc("zz")+0
  or       prg:#18fd88 std:#191488 adc("zz")+0 label_6(0017d6a0)   /entr
  load     std:#17d7e8 bxd("dd") [prg:#1901a0] +-800]
  load     std:#17d8bc bxd("zz") [prg:#18fd88] +0 prg:#184190]
  mult     std:#17d8f4 prg:#17d820 std:#17d8bc
  add      std:#17d990 std:#17d7e8 std:#17d8f4
  store    bxd("dd") [prg:#1901a0] +-800 ] std:#17d990 load     std:#184c54 bxd("dd") [prg:#1901a0] +-792 ]
  add      std:#18fefc prg:#18fd88 prg:#184190
  load     std:#184cb4 bxd("zz") [std:#18fefc] +8 ]
  mult     std:#184d10 prg:#17d820 std:#184cb4
  add      std:#184d70 std:#184c54 std:#184d10
  store    bxd("dd") [prg:#1901a0] +-792 ] std:#184d70 label_7:
  add      prg:#184190 prg:#184190 cnt:16
  add      prg:#1901a0 prg:#1901a0 cnt:16
  sub      (prg:#183e34,prg:#1904f0) prg:#183e34 cnt:1
  bgt      #albel_6 prg:#1904f0 label_9:
  return   none
```

COMPILING APPARATUS AND A COMPILING METHOD

BACKGROUND OF THE INVENTION

1. Field of the Invention

The present invention relates to a compiling apparatus for improving the performance of and optimizing compiler.

Recent computers are required to operate at high speed. To improve the operation speed, processors that simultaneously execute a plurality of instructions and machines that carry out vector operations have been developed. These situations have raised the needs of optimizing compilers.

Compilers translate a source program written in a programming language such as C, FORTRAN, and COBOL into another language such as assembler. The "optimization" of compiling means to translate a source program in such a way as to improve the execution speed of a translated program and reduce a memory area required by the translated program, without changing the meaning of the source program.

Generally, compilers optimize a source program through intermediate representations, which are synonymous with intermediate languages, intermediate texts, or internal representations. The intermediate representations are independent of a computer or a work station that executes a translated program. Some of the intermediate representations are eliminated, moved, and integrated through optimization, to thereby provide optimized object codes. The selection of intermediate representations, therefore, affects the performance and speed of optimization. If the types and contents of the intermediate representations are fixed according to a specific stand point, the optimization will frequently be unsuccessful because there are various kinds of optimization and final objects that will not fit the fixed intermediate representations.

The present invention relates to optimizing a compiler that translates a programming language into an assembler language or a machine language.

2. Description of the Related Art

Optimization means deleting, moving, and integrating intermediate representations, to provide high-speed small-sized efficient object code.

The intermediate representations must be independent of languages and machines when achieving the optimization and providing common code generators and standardized parts. The intermediate representations are explained in, for example, a reference 1 "Compiler: principles, techniques, and tools" by A.V. Aho et al, Science, and a reference 2 "A way of thinking of intermediate languages," Interface, March 1989, pp 211 to 219.

Conventional optimization involves a front end, an optimizing section, and a code output section.

The front end provides intermediate representations according to a source program. The intermediate representations are optimized by the optimizing section, to improve the execution speed of the program and reduce the size of the program. The optimized result is supplied to the code output section, which provides code based on a machine-dependent programming language such as a machine language dedicated to a target machine. The intermediate representations optimized by the optimizing section are independent of languages and machines.

There are compilers that change the structure of intermediate representations during optimization. Such compilers are explained in a reference 3 "Optimizing compilers for SPARC" by S. S. Muchnick, Sun Technology, 1988, and in a reference 4 "A global optimizer for Sun FORTRAN, C and Pascal" by Ghodssi, Vida, S. S. Muchnick, and Alex Wu, USENIX Conference, 1986. These compilers mainly substitute existing processes for partial processes during compilation and change the physical memory map of data structure of intermediate representations.

Japanese Unexamined Patent Publication No. 2-81137 discloses the structure of an optimizing compiler. Objects of this disclosure are to (1) efficiently optimize a source program, (2) efficiently collect optimization data, (3) quickly find optimization functions to achieve, (4) eliminate side effect elements of the source program, and (5) clear side effects of the source program. This prior art initially changes an intermediate language (intermediate representations) and optimizes the changed one.

As explained above, the conventional compilers design and prepare an optimizing section according to fixed intermediate representations, causing the following problems:

(1) Machine instructions and intermediate representations do not always have a one-to-one relationship. For example, if an instruction scheduling function that determines the positions of different machine instructions is compiled under a single intermediate representation, the intermediate representation will be unable to optimize the different machine instructions involved in the function.

(2) Even if all intermediate representations provided by a front end are related to machine instructions, respectively, there will still be the following problems:

(a) The intermediate representations provided by the front end must be independent of a target machine. If not so, different intermediate representations must be prepared for different target machines, and the front end must be renewed whenever a compiler is prepared.

(b) Relating instructions and intermediate representations to each other in a one-to-one relationship in the front end increases the number of the intermediate representations, to thereby complicate optimization and elongate an optimization time. For example, if a target machine is designed for 32-bit instructions and if it is impossible to load or store a 32-bit address at one time, two instructions are combined to substitute for a load/store instruction to address 32 bits. If the front end relates the two instructions to different intermediate representations, it is necessary to recognize during optimization that the two specific instructions serve as the single load/store instruction. This is not as simple as recognizing a single load or store instruction and complicates the optimization.

(3) Each optimization function is applied only to a predetermined intermediate representation. This puts limits on the front end and on optimization.

The intermediate representation changing techniques disclosed in the references 3 and 4 completely change the physical data structures of intermediate representations. Accordingly, these techniques hardly standardize optimization functions.

SUMMARY OF THE INVENTION

An object of the present invention is to provide a compiling apparatus and a compiling method that meet a variety of requirements for optimization. A compiler according to the present invention provides a high-performance object code according to a target architecture, a source program, and optimization requirements. The present invention standardizes intermediate representation changing processes and optimizing processes, to provide an efficient compiler.

In order to accomplish the objects, the present invention provides a compiling apparatus having a front end for providing intermediate representations according to a source program, an optimizing unit for optimizing the intermediate representations, at least one intermediate representation changing unit for changing the optimized intermediate representations, and a code output unit for providing codes according to the last obtained intermediate representations. The compiling apparatus is characterized by an optimizing structure determination unit for determining the number of repetitions of an optimization phase achieved by the optimizing unit and intermediate representation changing unit and selecting optimization functions carried out in each of the optimization phases. According to the determination by the optimizing structure determination unit, the intermediate representations are changed and optimized in each of the optimization phases.

The optimizing structure determination unit determines the number of the intermediate representation changing and optimizing processes according to the program-dependent intermediate representations provided by the front end, object-architecture-dependent intermediate representations, and the selected optimization functions.

The physical memory map structure of main data of the intermediate representations during the intermediate representation changing and optimizing processes is fixed.

The fixed physical memory map structure helps standardize the intermediate representation changing and optimizing processes.

The optimizing structure determination unit may select a plurality of optimizing structures, separately carry out optimization according to each of the selected structures, and select the most proper one among the optimizing structures according to the optimization results.

The optimizing unit and intermediate representation changing unit may repeat predetermined optimization.

The compiling apparatus may have a switch that connects and disconnects the optimizing structure determination unit in front of the optimizing unit and intermediate representation changing unit.

When the switch is turned ON, the optimizing structure determination unit determines an optimizing structure in each compiling phase. According to the optimizing structure, intermediate representations corresponding to a source program are changed, and optimization function to be applied are selected.

When the switch is turned OFF, the optimizing unit and intermediate representation changing unit repeat predetermined intermediate representation optimizing and changing processes a predetermined number of times.

The optimizing unit and intermediate representation changing unit may have a variable identifying a present phase when repeating the same optimization.

The compiling apparatus may have a selection switch to determine whether or not an optional one of the optimization functions must be achieved in an optional one of the optimizing phases.

The selection switch may be externally controlled to stop an optional optimization function in an optional phase.

The compiling apparatus may have a printing unit for printing intermediate representations in each phase and a selection switch for selecting the printing unit.

The selection switch may be externally controlled to print intermediate representations at optional timing in any one of the phases.

BRIEF DESCRIPTION OF THE DRAWINGS

The present invention will be more clearly understood from the description as set forth below with reference to the accompanying drawings, in which:

FIG. 3 explains an optimizing structure determination flow;

FIG. 4(A) shows examples of intermediate representations at an input end of optimization;

FIG. 4(B) shows examples of intermediate representations at an output end of the optimization;

FIG. 5 shows optimization functions and their classes;

FIG. 6(A) shows examples of optimization data stored in a table;

FIG. 6(B) shows other examples of optimization data stored in a table;

FIG. 7(A) shows a data structure in a table used for changing intermediate representations;

FIG. 7(B) shows a data structure in a table used for optimization;

FIG. 9 shows an example of a program used for explaining the operation of the compiler according to the embodiment of the present invention;

FIG. 10 shows outputs of a front end with respect to the program, according to the embodiment of the present invention;

FIG. 11 shows outputs after optimization A according to the embodiment;

FIG. 12 shows intermediate representations after a change (IE1) according to the embodiment;

FIG. 13 shows other intermediate representations after the change (IE1);

FIG. 14 shows outputs after optimization B according to the embodiment;

FIG. 15 shows other outputs after the optimization B; and

DESCRIPTION OF THE PREFERRED EMBODIMENTS

Before describing the preferred embodiments according to the present invention, an example of the related art is provided.

Figure 1:
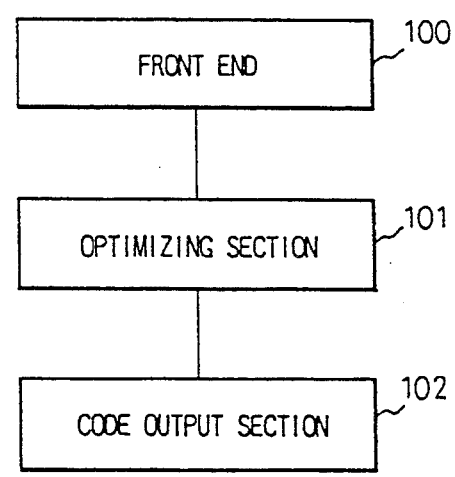
FIG. 1 explains a conventional optimizing compiler.

FIG. 1 explains optimization according to the prior art. A front end 100 provides intermediate representations according to a source program, so that the source program can be compiled. An optimizing section 101 optimizes the intermediate representations provided by the front end 100, to improve the speed of the source program and reduce the size of the source program. A result of the optimization is supplied to a code output section 102, which provides code in a machine-dependent program language such as a machine language.

The intermediate representations optimized by the optimizing section 101 are independent of languages and machines.

Figure 2:
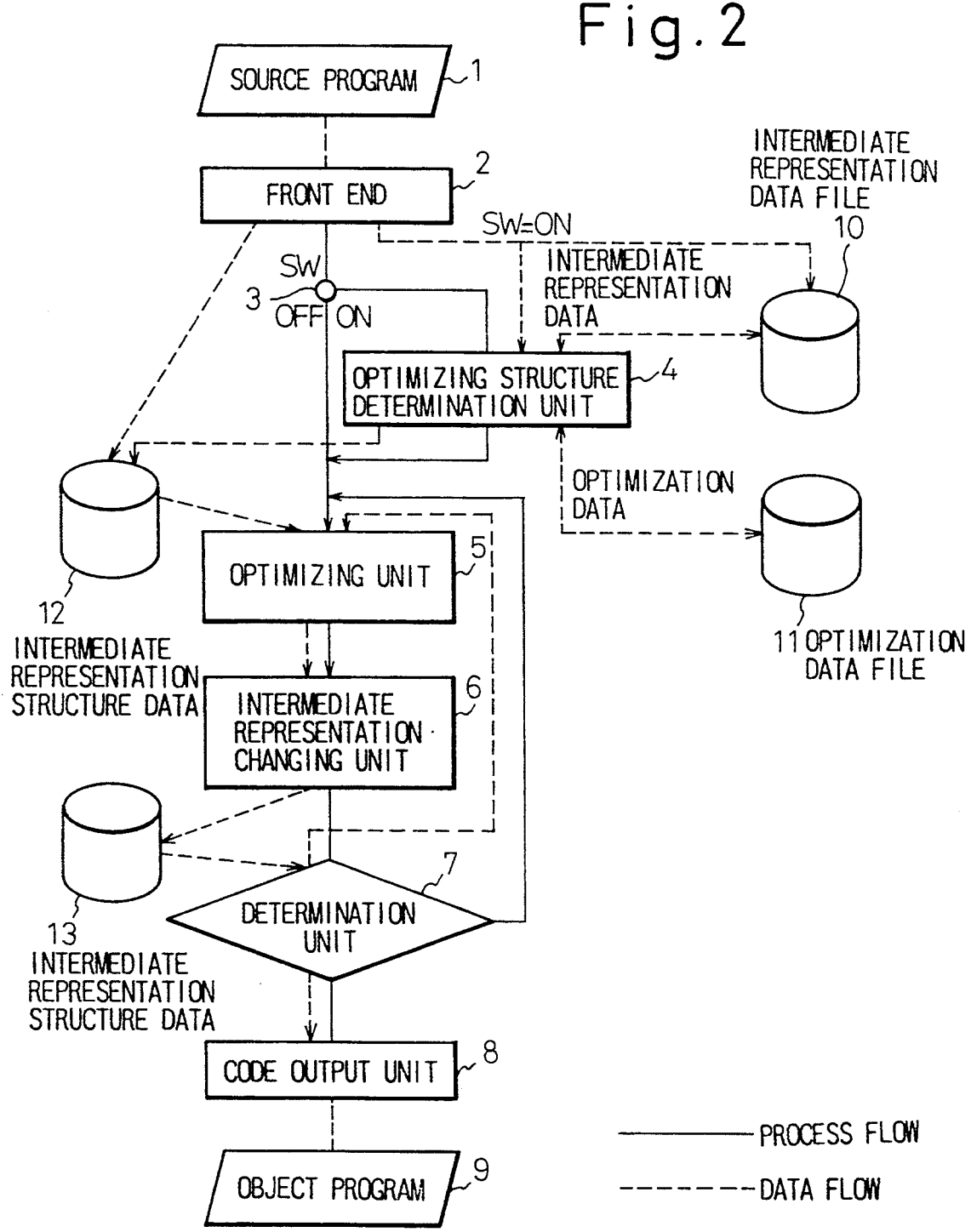
FIG. 2 shows a principle of the present invention.

FIG. 2 shows a principle of the present invention.

In the figure, numeral 1 is a source program, 2 is a front end for providing intermediate representations corresponding to the source program 1, 3 is a switch that is usually turned ON to determine an optimizing structure, 4 is an optimizing structure determination unit, 5 is an optimizing unit, 6 is an intermediate representation changing unit, 7 is a determination unit, 8 is a code output unit, and 9 is an object program. The optimizing structure determination unit 4 may be arranged inside or outside a compiler. Determined results of the unit 4 are provided to the optimizing unit 5 and intermediate representation changing unit 6.

An intermediate representation data file 10 stores intermediate representation data used for providing first intermediate representations from the front end 2, or for providing an object program. An optimization data file 11 stores optimization data used for determining an optimizing structure. The file 11 also stores determined optimization data. Intermediate representation structure data 12 is provided by the front end 2. Intermediate representation structure data 13 is provided by the intermediate representation changing unit 6.

According to the source program 1 provided to the front end 2 and according to the target machine, the optimizing structure determination unit 4 selects optimization functions to achieve and determine the number of repetitions of an intermediate representation changing process. According to the determination, a loop operation of the optimizing unit 5 and intermediate representation changing unit 6 is repeated. The same optimization may be repeated several times, to provide a high-performance object program corresponding to the source program and target machine.

In FIG. 2, the front end 2 changes the source program 1 into the intermediate representations. The switch 3 determines whether or not the optimizing structure determination unit 4 is used. The switch 3 may be optionally turned ON and OFF according to required optimization levels.

When the switch 3 is OFF, the optimizing unit 5 and intermediate representation changing unit 6 repeat a predetermined optimizing phase involving optimization and intermediate representation change a predetermined number of times. The optimizing phase is prepared according to the source program 1. When the determination unit 7 counts the predetermined number of times, the code output unit 8 prepares codes according to the last optimized and changed intermediate representations. These codes form the object program 9.

When the switch 3 is ON, the optimizing structure determination unit 4 arranged inside or outside the compiler obtains preliminary supplied front end intermediate representation data and target machine data from the intermediate representation data file 10. The unit 4 also obtains optimization data such as required optimization functions from the optimization data file 11. Then, the unit 4 determines the number of intermediate representation optimizing and changing processes. For example, for a simple optimizing structure, the unit 4 may determine one time of optimizing and changing source-program-dependent intermediate representations, and one time of optimizing and changing target-machine-dependent intermediate representations.

Once the optimizing structure determination unit 4 selects the optimization functions to achieve and the number of intermediate representation optimizing and changing processes, these results are informed to the optimizing unit 5, intermediate representation changing unit 6, and determination unit 7. At first, the optimizing unit 5 optimizes the source-program-dependent intermediate representations according to the intermediate representation structure data 12 provided by the front end 2. Thereafter, the intermediate representation changing unit 6 changes a part or the whole of the optimized intermediate representations, to provide the intermediate representation structure data 13. The determination unit 7 repeats a loop of the intermediate representation optimizing and changing processes until the number determined by the optimizing structure determination unit 4 is counted. In each loop, the optimizing unit 5 carries out the specified optimization functions, and the intermediate representation changing unit 6 changes the optimized intermediate representations.

When the determination unit 7 counts the predetermined number, the code output unit 8 provides codes to form the object program 9 in machine language according to the last provided intermediate representation structure data 13.

Each of the optimizing unit 5 and intermediate representation changing unit 6 may have a function of determining whether or not the predetermined number of the intermediate representation optimizing and changing processes have been completed. In this case, the determination unit 7 may be omitted.

The optimizing structure determination unit 4 is able to repeatedly change and optimize intermediate representations, so that optimization functions that have not been applied to first intermediate representations may be applied to secondly changed intermediate representations. Instruction scheduling may be carried out and optimized in a stage where machine instructions and intermediate representations have a one-to-one relationship. This results in improving the optimizing performance of the compiler.

The optimizing unit 5 may have an intermediate representation changing function, to omit the intermediate representation changing unit 6.

FIG. 3 shows the flow of steps for determining an optimizing structure and related data.

Data 20 corresponds to the data 10 of FIG. 1 and indicates the characteristics of source-program-dependent intermediate representations provided by the front end. Data 21 indicates the characteristics of target-machine-dependent intermediate representations supplied to the code output unit that provides object codes after optimization. Optimization data 22 corresponds to the data 11 of FIG. 1 and is used to determine optimization functions and the number of repetitions of intermediate representation optimizing and changing processes.

In FIG. 3, step S1 picks up optimization functions to be held in a compiler. The optimization data 22 includes a list of optimization functions corresponding to the front-end intermediate representation data 20 and code-providing intermediate representation data 21, and the step S1 selects some of the optimization functions from the data 22, so that they are executed by the optimizing compiler. This selection may be made by a person who prepares the compiler.

Step S2 classifies the selected optimization functions into execution classes. At this time, the optimization functions are classified into those that are achieved on the front-end intermediate representations, those that are achieved on the code-providing intermediate representations, those that are achieved between the above two cases, and those that are achieved in instruction scheduling. The optimization functions are classified according to:

(1) the physical memory map structures of data of intermediate representations to be optimized, and
(2) objects to be optimized.

The item (2) means that a given optimization function is classified according to whether the function is carried out on a language or program structure such as a loop and a conditional statement, on a target structure such as a parallel structure and a register structure, or on both of them. The classified result is stored in the optimization data 22.

Step S3 determines a compiler structure in two steps S30 and S31. The step S30 determines the number of times of changing intermediate representations. In principle, this number corresponds to the number of classes of the classified optimization functions. The number may also be determined according to the types of intermediate representations and the intermediate representation dependencies of the optimization functions.

The step S31 determines the optimization functions in three steps S310, S311, and S312. The step S310 sorts the optimization functions on execution phases with reference to the types of intermediate representations and the intermediate representation dependencies. The step S311 extracts applicable ones among the optimization functions according to the application conditions of the functions. The step S312 determines the execution order of the optimization functions according to the front-end and code-providing dependencies of the functions.

Once the optimizing structure is determined, the intermediate representation optimizing and changing processes are carried out according to the determined results. Namely, the intermediate representations are changed and optimized phase by phase, to provide codes that form an optimized object program.

The processes of FIG. 3 for determining an optimizing structure will be explained in detail with reference to FIGS. 4(A) to 7(B).

This explanation relates to a compiler for a parallel RISC (reduced instruction set computer). 10 According to the RISC architecture, a memory is accessed only with a load/store instruction, and operations are always carried out between registers, to improve hardware speed. The parallel RISC architecture has a function of simultaneously executing a plurality of instructions. Although the following explanation relates to the compiler for the parallel RISC architecture, the present invention is applicable for any other processors. In the following explanation, a front end is prepared for a language, with no regard to targets. This provision is right because the specifications of a language are unchanged for different targets.

FIGS. 4(A) and 4(B) show examples of intermediate representations at I/O sections of a compiler, in which FIG. 4(A) shows intermediate representations provided by a front end, and FIG. 4(B) shows intermediate representations for providing output codes. The intermediate representations of FIG. 4(A) are dependent on a source program, and those of FIG. 4(B) are dependent on a target architecture. These intermediate representations correspond to the data 20 and 21 of FIG. 3 used to determine an optimizing structure.

FIG. 4(A) shows the attributes of each intermediate representation corresponding to a code (an operator). The attributes include the type, code, data types, operands, and conditions of the intermediate representation.

Taking the first intermediate representation of Fig. 4(A) as an example, the type is a generic LINDA, the code is an operator LOAD, the data types are $I1$ to $I4$ representing signed data of one to four bytes, $u1$ to $u4$ representing unsigned data of one to four bytes, $r8$ to $r16$ representing floating-point data of 8 to 16 bytes, and $c8$ to $c32$ representing fixed-point data of 8 to 32 bytes, the operands are one or two, and the conditions are a boundary (an unguaranteed boundary X) and an address representation of three values. Similarly, intermediate representations for codes (operators) ADD and cmove are shown in FIG. 4(A).

FIG. 4(B) shows the intermediate representations for providing codes that are dependent on the target architecture. Although the intermediate representations of FIG. 4(B) resemble those of FIG. 4(A), the contents of them do not always agree with each other. For example, the data types of the code LOAD of FIG. 4(B) do not include $r16$ and $c8$ to $c32$, and the intermediate representation for the code "cmove" is not included in FIG. 4(B).

FIG. 5 shows optimization functions to be achieved by the compiler. These functions are picked up in the step S1 of FIG. 3. In FIG. 5, each of the optimization functions numbered from 1 to 22 has a title. For example, the optimization function No. 1 is titled "CONSTANT FOLDING" to fold constants. This function folds, for example, "1+3" as "4." The optimization function No. 2 is titled "CONSTANT PROPAGATION" to propagate constants. Reference marks MPA, MPB, and SCH shown in FIG. 5 will be explained later. These data are in the form of a table or a database and are stored as the optimization data 22 of FIG. 3.

FIGS. 6(A) and 6(B) show examples of the optimization functions stored in the table. The figures show only data for entry numbers 1, 4, 14, 16, 18, and 22. These entry numbers correspond to the optimization function numbers shown in FIG. 5. Taking the entry number 1 as an example, the title is "constant folding", the type of applicable intermediate representation is "LINDA", an operator is "*" (don't care) to mean that this optimization function is irrelevant to operators, an operand is "cnt" (a constant), and intermediate representation dependencies are shown.

The entry number 4 has the title "CSE" (common subexpression elimination) and, as an intermediate representation dependency, a boundary of X to indicate unguaranteed. In this way, each of the optimization functions corresponding to the entry numbers 14, 16, 18, and 22 has data shown in FIGS. 6(A) and 6(B).

According to the data shown in FIGS. 4(A), 4(B), 6(A), and 6(B), the optimizing structure determining flow of FIG. 3 is carried out.

If the intermediate representations provided by the front end and the intermediate representations for providing codes completely agree with each other, it is not necessary to change the intermediate representations. If they do not agree with each other as shown in FIGS. 4(A) and 4(B), the optimizing structure determining flow of FIG. 3 is carried out.

Namely, the step S1 of FIG. 3 picks up optimization functions as shown in FIG. 5. The step S2 of FIG. 3 classifies the optimization functions according to the conditions (1) and (2) explained above. Since this embodiment employs the same physical memory map structure for data of each intermediate representation, it is not necessary to classify the optimization functions according to the condition (1). According to the condition (2), the language- or program structure-dependent optimization functions are achieved on a source program structure or on variables, and the architecture-dependent optimization functions are achieved on the specifications of a target machine architecture.

Memory addressing instructions such as a register allocation instruction and an instruction scheduling instruction are dependent on architecture. Accordingly, optimization functions carried out on these instructions are also the architecture-dependent optimization functions. According to the embodiment of the present invention, the architecture-dependent optimization functions are classified into two as follows:

(1) optimization functions that manipulate instructions themselves, e.g., reducing the number of instructions and changing an instruction into another of higher speed (for example, changing a multiplication instruction into a repetition of addition)

(2) optimization functions related to the order of instructions

The optimization functions 1 to 22 of FIG. 5 are classified according to these criteria into classes MPA, MPB, and SCH. Here, the class MPA includes language-dependent (source-program-dependent) optimization functions to be carried out on language-dependent intermediate representations, the class MPB includes architecture-dependent (target-machine-dependent) optimization functions to be carried out on architecture-dependent intermediate representations, and the class SCH includes optimization functions related to the execution order of instructions among the architecture-dependent optimization functions.

In FIG. 5, any optimization function with a plurality of marks o is repeatedly carried out on different kinds of intermediate representations.

After the classification, the step S3 of FIG. 3 determines a compiling structure. The step S30 determines the number of times of changing intermediate representations according to the types of intermediate representations and the number of intermediate representation dependencies shown in FIGS. 6(A) and 6(B).

In this embodiment, the intermediate representations are of only one type, LINDA. The number of intermediate representation dependencies is two for the "boundary" excluding those with a mark "*" (don't care). The two intermediate representation dependencies are as follows:

boundary: bxd, axd    address 2
(referred to as phase 3)

boundary: x    address 2
(referred to as phase 2)

In addition, there is the following output from the front end:

boundary: x    address 3
(referred to as phase 1)

Accordingly, the intermediate representations must be changed three times.

The step S31 of FIG. 3 sets the timing and positions to carry out the optimization functions.

According to the types of the intermediate representations and the intermediate representation dependencies of the optimization functions shown in Figs. 6(A) and 6(B), the step S310 of FIG. 3 sorts the optimization functions on the phases 1, 2, and 3. The entry numbers (function numbers) 1, 4, 14, and so on of FIGS. 6(A) and 6(B) are sorted as follows:

Phase 1: 1, 4, 14, 16
Phase 2: 1, 4, 14, 16, 18
Phase 3: 22

The step 311 of FIG. 3 extracts proper ones among these optimization functions according to application conditions as follows:

Phase 1: 1, 4, 14, 16
Phase 2: 1, 4, 18
Phase 3: 22

The step 312 of FIG. 3 determines the execution order of the optimization functions according to the dependencies as follows:

Phase 1: 14, (1, 4), 16
Phase 2: (1, 4), 18
Phase 3: 22 where (1, 4) means either of 1 or 4 may be carried out at first.

In this way, the optimizing structure is determined. According to the determination, the intermediate representations are automatically optimized and changed. For automatization, the following must be prepared:

1) A data structure each element of which corresponds to an item of a table
2) Data encoded into a string of characters or numbers to be held as an internal structure of the compiler FIG. 7(A) shows a table used to change intermediate representations, and FIG. 7(B) shows a table used for carrying out an optimization function. In the figures, IML is an intermediate representation. The table of FIG. 7(A) for a given intermediate representation contains the type of the intermediate representation (IML-TYPE), an operation code (CODE-TYPE), a list of data types, a list of operands, etc. The table of FIG. 7(B) for a given optimization function contains an optimization function number, the name of the optimization function, the type of an intermediate representation on which the optimization function is carried out, a list of applied operators, etc. These data are stored in the optimization data file 11 of FIG. 2.

An embodiment of the present invention will be explained with reference to FIGS. 8 to 16.

Figure 8:
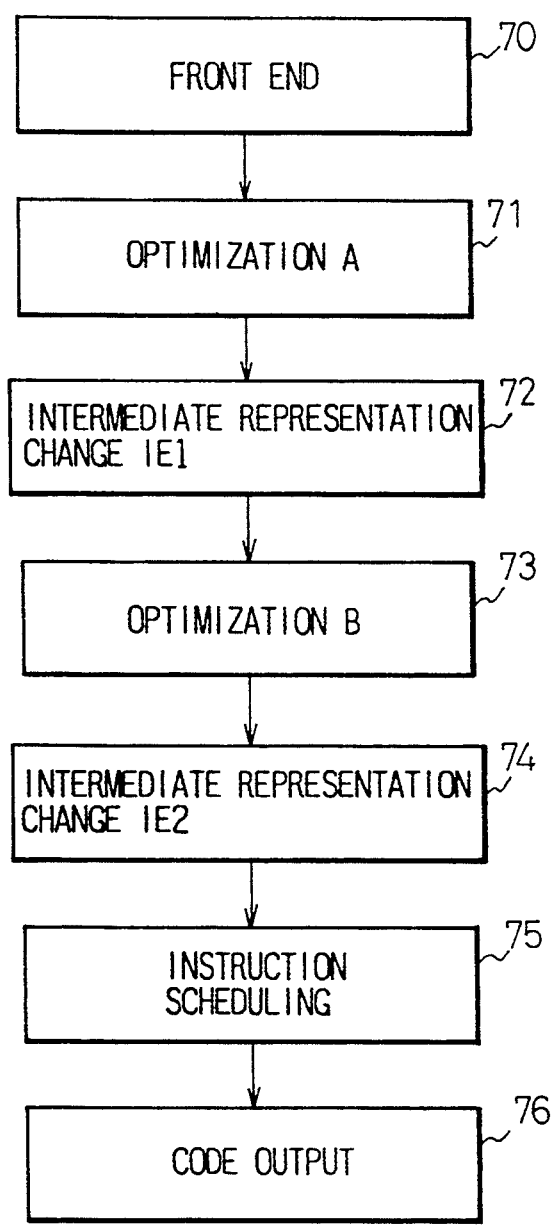
FIG. 8 shows a compiler according to an embodiment of the present invention.
Figure 16:
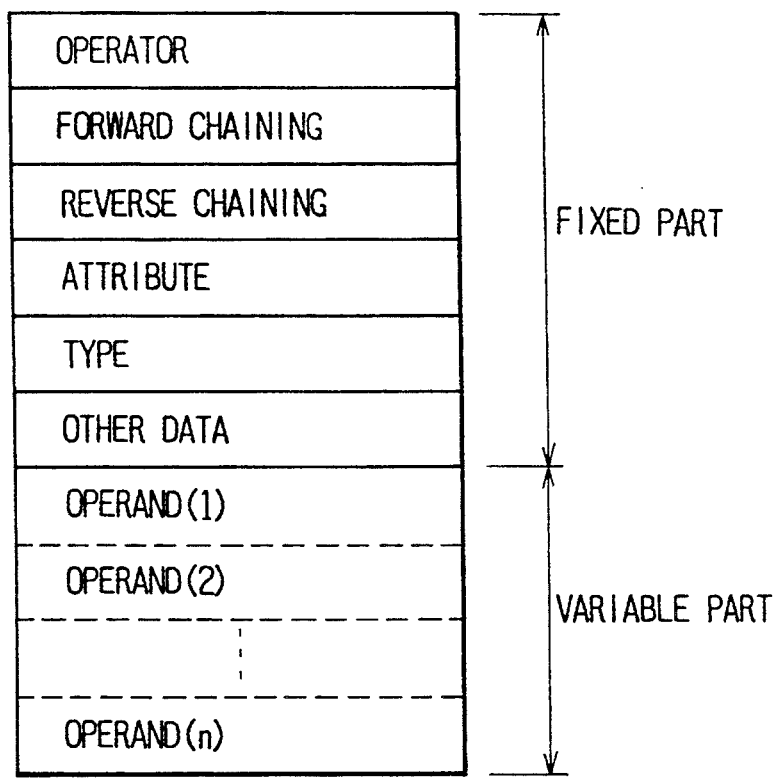
FIG. 16 explains the data structure of an intermediate representation.

FIG. 8 shows the structure of a compiler according to the embodiment. This structure is provided by the optimizing structure determining flow of FIG. 3.

The optimizing structure of a compiler for a program for the parallel RISC can be obtained as explained with reference to FIGS. 4(A) and 4(B) to 7(A) and 7(B). The structure of FIG. 8 is obtainable in the same manner.

The structure of FIG. 8 carries out optimization three times in phases 1 to 3, which correspond to the classes MPA, MPB, and SCH of FIG. 5. Intermediate representations are changed three times, accordingly. Among the three times of changing, the first one is carried out by a front end to change a source program into first intermediate representations.

In FIG. 8, the front end 70 provides the first intermediate representations according to the source program. Optimization A (71) optimizes the first intermediate representations provided by the front end 70. The optimization A involves the optimization functions classified into the class MPA (phase 1) of FIG. 5. Interface expansion IE1 (72) changes the optimized intermediate representations, to provide intermediate representations of target instruction level. Optimization B (73) optimizes these intermediate representations.

The optimization B involves the optimization functions classified into the class MPB (phase 2) of FIG. 5. Interface expansion IE2 (74) changes the optimized intermediate representations, to provide intermediate representations of instruction scheduling level. Instruction scheduling 75 is carried out on these intermediate representations. The instruction scheduling 75 involves the optimization function 22 of the class SCH (phase 3) of FIG. 5. According to a result of this optimization function, a code output section 76 provides codes.

According to this embodiment, the front end provides the first intermediate representations. Generally, these intermediate representations provided by the front end are irrelevant to a target. If not so, different intermediate representations must be prepared for different targets, and therefore, a new front end must be prepared whenever a compiler is formed.

When adding a new optimization function to the structure of FIG. 8, or when changing the specifications of optimization, the steps S1 to S3 of FIG. 3 may be repeated to determine a compiler structure. If the number of classes of optimization functions is increased, a step of changing intermediate representations will be added, to form a compiler structure that provides a high-performance object.

The optimizing structure determination flow of FIG. 3 may be carried out by externally selecting and setting required data. If the specifications of optimization functions are registered in tables as shown in FIGS. 7(A) and 7(B), proper ones of the functions may be automatically picked up. In this case, the optimizing structure determination may be omitted. Namely, this case corresponds to turning OFF the switch 3 of FIG. 2.

It is possible to select a plurality of optimizing structures and separately operate them. According to the results of the operations, the best one of the optimizing structures will be selected to provide a high-performance object.

When operating the plurality of optimizing structures, the following conditions are applied:
(1) If there are a plurality of processors, they will be allocated for the optimizing structures, respectively.
(2) If there is one processor, the optimizing structures are operated one after another before providing codes. Lists of resultant intermediate representations of the respective optimizing structures are stored.

An execution time is estimated for each of the listed elements, i.e., for a string of the intermediate representations of each of the optimizing structures, and object codes are prepared according to the intermediate representations that provide the shortest execution time. The execution time is calculable because instructions corresponding to the intermediate representations are known, and the execution time of each of these instructions is known because the execution time is architectural data required for instruction scheduling. If there are loops and if the number of loops is statically known, the execution time of instructions will be multiplied by the number of loops. If the number of loops is unknown, the execution time may be multiplied by the same constant. In this case, no serious error will occur because every code is under the same condition.

The flow of FIG. 3 can be incorporated as a compiling phase in a compiler, to select optimization functions according to a source program.

Additional functions of the embodiment of FIG. 8 will be explained.

According to the embodiment of FIG. 8, intermediate representations provided by the front end are repeatedly optimized and changed through phases. A selection switch (different from the switch 3 of FIG. 2) may be provided for each of the phases, to determine whether or not the intermediate representation optimizing and changing processes of a corresponding phase must be carried out. The switches may be controlled from outside of the compiler, to stop the processes of an optional phase. This function may be provided as an option of the compiler. If the option stands, the corresponding phase is passed (returned). This reduces a translation time and improves the efficiency of debugging when preparing a compiler.

The arrangement of FIG. 8 may have a function of printing intermediate representations. Namely, a selection switch may be arranged to determine whether or not intermediate representations in each phase are printed. This selection switch is different from the selection switch for selecting whether or not the optimizing and changing processes of a given phase are carried out. The printing function of intermediate representations may be called by controlling an option during the debugging of a program or the processing of the compiler, to print intermediate representations at an optional location of an optional phase, to improve debugging efficiency.

FIGS. 9 to 16 show examples of intermediate representations at each optimization phase with respect to a program, according to the compiling structure of FIG. 8.

FIG. 9 shows a program for explaining the operation of the compiler according to the embodiment, FIG. 10 shows outputs of the front end with respect to the program, FIG. 11 shows outputs after the optimization A, FIGS. 12 and 13 are intermediate representations after the intermediate representation change IE1, and FIGS. 14 and 15 show outputs after the optimization B.

Essential ones of the marks shown in FIGS. 10 to 16 will be explained.

label-n ($0 <= n$) is a base block. Intermediate texts forming the block follow the label. Each of the intermediate texts includes an operator and a string of operands. The operator is separated from the operands by a space.

The operands are as follows:

var: a variable std, prg: a temporary variable produced by the compiler axd, bxd: an array, structure data cnt: a constant The front end provides intermediate representations shown in FIG. 10 with respect to the source program of FIG. 9. In FIG. 10, the intermediate representations and instructions do not always correspond to each other in a one-to-one relationship. This will result in insufficient optimization.

With respect to these outputs of the front end, the optimization A (71 of FIG. 8) is carried out. Namely, the optimization functions classified into the class MPA of FIG. 5 are achieved on the front-end outputs. FIG. 11 shows results of the optimization A. Comparing FIGS. 10 and 11 with each other, the effect of the optimization is apparent. Namely, a variable XX and array elements dd(i) are collectively handled. A structure assignment is achieved with a single intermediate representation.

The intermediate representations provided by the optimization A of FIG. 11 are changed by the interface expansion IE1 (72 of FIG. 8) into intermediate representations shown in FIGS. 12 and 13. The interface expansion IE1 changes the intermediate representations provided by the optimization A according to target instruction sets and the optimization functions included in the next optimization B (73 of FIG. 8). An object of the interface expansion IE1 is to provide clear intermediate representations as an object of the optimization B.

As shown in FIGS. 12 and 13, the XX and dd(i) have increased the number of intermediate representations and changed the operands according to addressing. A structure assignment statement has been changed into a loop structure. The intermediate representation change by the interface expansion IE1 is achievable according to branch tables because an output is uniquely determined once the code and operands of a corresponding input intermediate representation are determined. Other techniques are also employable.

With respect to the outputs of the interface expansion IE1 of FIGS. 12 and 13, the optimization B (73 of FIG. 8) is carried out. Objects of the optimization B are target-dependent parts that do not directly appear in the source program, or parts that have not been analyzed in the front end. As shown in FIG. 5, these parts overlap those for the optimization A. According to this embodiment, the following items are also objects of the optimization B:

1. Optimization of address calculations
2. Loop processes of structure assignment According to this embodiment, the functions of the optimization B are basically the same as those of the optimization A. Accordingly, the optimization B is achieved by calling the same functions as those for the optimization A as much as possible. For this purpose, the types of the intermediate representations must be considered. The repetition of the optimization will be explained later.

The prior art does not carry out the optimization B of the present invention. Namely, the prior art does not achieve the optimization functions included in the optimization B, so that, if the RISC architecture is a target, a high-performance object will not be provided. Accordingly, the interface expansion IE1 (72 of FIG. 8) and optimization B are indispensable processes.

FIGS. 14 and 15 show results of the optimization B. Comparing the intermediate representations after the interface expansion IE1 of FIGS. 12 and 13 with the results of the optimization B of FIGS. 14 and 15, it will be understood that basic optimization is achieved after the interface expansion IE1.

According to the embodiment of FIG. 8, the functions of the optimization A and those of the optimization B are standardized. According to another embodiment, the optimization A and optimization B may be achieved with separate functions.

When changing the intermediate representations by the phase IE1 (72 of FIG. 8) of the embodiment of FIG. 8, the instructions and intermediate representations are not completely in a one-to-one relationship. This is because processes after the phase IE1 are classified into the following two groups according to functions and data to use:

(1) The optimization B and register assignment
(2) Instruction scheduling

The item (1) above relates to providing instructions as follows:

(a) Deleting dead instructions
(b) Collecting overlapping instructions
(c) Providing speedier instructions The item (2) above does not relate to providing instructions but improves hardware efficiency by properly setting the execution order of instructions. Accordingly, it is preferable not to put the instructions and intermediate representations in a one-to-one relationship just after the intermediate representation changing of the phase IE1.

In the instruction scheduling, a double-precision load/store instruction must be divided into two single-precision instructions. The reason is because these two instructions can be executed in parallel with each other. Namely, these instructions will be more quickly completed if they are separately executed than if they are sequentially executed. In terms of register assignment and optimization, however, the two single-precision instructions originally indicate a single entity. Accordingly, if they are separately handled, the operation of the compiler during the optimization A will be complicated. In addition, in terms of the register assignment, consecutive registers must be allocated for the two separate instructions, so that information indicating that the two instructions are continuous must be provided for the register assignment.

On the other hand, the intermediate representation changing phase IE2 (74 of FIG. 8) relates to the instruction scheduling, so that the intermediate representations and actual instructions are decomposed to form one-to-one relationship. This is achieved as in the case of the intermediate representation changing phase IE1 (72 of FIG. 8).

According to the embodiment, the instruction scheduling is carried out after the register assignment, according to a known technique. Instead of carrying out the instruction scheduling after the register assignment, the following approaches 1 to 4 may be employable:

1. Carrying out the instruction scheduling before the register assignment
2. Simultaneously carrying out the instruction scheduling and register assignment
3. Repeating the register assignment and instruction scheduling in optional order 4. Repeating the register assignment and instruction scheduling in optional order and carrying out optimization during the repetition.

In each of these cases, instructions and intermediate representations are related to each other in a one-to-one relationship before the instruction scheduling, to determine how to change the intermediate representations, i.e., to determine the timing of the instruction scheduling.

The types of intermediate representations will be explained. According to the embodiment, each intermediate representation has a data structure shown in FIG. 16. To make an actual program according to the structure of FIG. 16, the following structure declaration is made, so that the number of operands becomes variable depending on an operator.

struct OperandType operand[1];

In this way, the physical memory map structure of intermediate representations can be fixed between phases of a compiler.

Changing intermediate representations will be explained. In the following explanation, the "instructional intermediate representation" means an intermediate representation corresponding to an instruction. For example, #label-2 of FIG. 10 contains the following parts:

move var:("1") cnt: 0 bqe #label-o var:("1") var:("n") Here, "move var:("1") cnt:0" is an instructional intermediate representation. The "move" is an operator or an instructional intermediate representation code, the "var:("1")" is an operand 1 (first operand), and "cnt:0" is an operand 2 (second operand). Changing an intermediate representation means:

(1) Changing an operand pointed to by the intermediate representation. In FIGS. 9 to 15, examples of this case will be seen as changes in operands of instructional intermediate representations. This is carried out by shifting the pointer. In FIG. 10, changes in operands of an instructional intermediate representation are as follows:

"move var:("1") cont:0" of #label-2 in the front end output of FIG. 10 is changed to "move prg:#17cddc("1") cnt:0" of #label-2 in the output of the optimization A of FIG. 11.

(2) Changing the operator of the intermediate representation (3) Changing the output method of the intermediate representation. This means to provide a plurality of instructional intermediate representations or a loop structure according to an instructional intermediate representation. For example, "cmove" in FIGS. 10 and 11 is changed into a loop of #label-14 after the phase IE1 as shown in FIG. 12 and after the optimization B as shown in FIG. 14.

In this way, the meanings of the intermediate representations are changeable without changing their data structures.

Repetition of optimization will now be explained.

This embodiment standardizes intermediate representations to be optimized, to carry out uniform optimization in each optimization phase. A variable indicating the presently processed phase is used, and individual optimizing routines are standardized.

The optimization can be repeatedly called in the same phase. The repetition of the optimization is achievable in the following methods:

(1) A person who makes a compiler determines the repetition.

(2) A flag indicating whether or not intermediate representations have been changed is prepared. This flag is initially OFF. If intermediate representations are changed during optimization, the flag is turned ON. When the flag is ON, the flag is initialized, and the optimization is repeated.

(3) Optimization is repeated the predetermined number of times, which may be determined by a person who prepares a compiler, or may be optionally set from the outside.

(4) The methods (1) to (3) are combined.

This embodiment employs the method (1). Any one of the repetition methods (1) to (4) may be selected by a user according to an optimization level.

As explained above, the present invention provides an optimizing compiler proper for a given architecture. The optimizing compiler determines a compiler structure, to optimize a source program. The present invention carries out optimization at a proper position according to the characteristics of the source program and architecture, to provide a high-performance object.

The present invention is capable of repeating optimization through compiling phases, to provide a high-performance object.

The present invention carries out the same optimizing and intermediate representation changing processes in respective sections of a compiler, to thereby improve the efficiency of the compiler.

What is claimed is:

1. A compiling apparatus in a data processing apparatus, comprising:
   a front end providing intermediate representations described by an intermediate language according to a source program;
   optimizing means for optimizing the intermediate representations from the front end in accordance with predetermined optimization functions;
   at least one intermediate representation changing means for further transforming the optimized intermediate representations from the optimizing means in accordance with predetermined optimization functions;
   code output means for providing code according to the intermediate representations finally obtained by the optimization from the intermediate representation changing means; and
   optimizing structure determination means for determining a number of repetitions of an optimization phase achieved by the optimizing means and intermediate representation changing means and selecting the optimization functions for directing an optimizing process carried out in each of the optimization phases, and thereby the intermediate representations being changed and optimized.

2. The compiling apparatus according to claim 1, wherein the optimizing structure determination means determines the number of times of changing the intermediate representations and selects optimization functions to be achieved in each phase according to the intermediate representations dependent on the source program provided by the front end, intermediate representations dependent on an object architecture, and the applied optimization functions.

3. The compiling apparatus according to claim 2, further comprising a switch that connects and disconnects the optimizing structure determination means in front of the optimizing means and intermediate representation changing means, the switch being turned ON to determine an optimizing structure in a compiling phase, change intermediate representations according to the source program, and change optimization functions to be applied.

4. The compiling apparatus according to claim 3, wherein, when the switch is turned OFF, the optimizing means and intermediate representation changing means repeat predetermined intermediate representation optimizing and changing processes a predetermined number of times.

5. The compiling apparatus according to claim 4, wherein the optimizing means and intermediate representation changing means have a variable identifying a present phase when repeating the same optimization.

6. The compiling apparatus according to claim 4, further comprising a selection switch to determine whether or not an optional one of the optimization functions must be achieved in an optional one of the optimizing phases, the selection switch being externally controlled to stop an optional optimization function in an optional phase.

7. The compiling apparatus according to claim 3, further comprising a selection switch to determine whether or not an optional one of the optimization functions must be achieved in an optional one of the optimizing phases, the selection switch being externally controlled to stop an optional optimization function in an optional phase.

8. The compiling apparatus according to claim 2, wherein the optimizing means and intermediate representation changing means repeat the same predetermined optimization.

9. The compiling apparatus according to claim 2, wherein a physical memory map structure of main data of the intermediate representations during the intermediate representation changing and optimizing processes is fixed; and the fixed physical memory map structure are commonly used by the intermediate representation changing and optimizing processes.

10. The compiling apparatus according to claim 2, wherein the optimizing structure determination means selects a plurality of optimizing structures, separately carries out optimization according to each of the selected structures, and selects the best optimizing structure among the optimizing structures according to the optimization results.

11. The compiling apparatus according to claim 1, further comprising a switch that connects and disconnects the optimizing structure determination means in front of the optimizing means and intermediate representation changing means, the switch being turned ON to determine an optimizing structure in a compiling phase, change intermediate representations according to the source program, and change optimization functions to be applied.

12. The compiling apparatus according to claim 11, wherein, when the switch is turned OFF, the optimizing means and intermediate representation changing means repeat predetermined intermediate representation optimizing and changing processes a predetermined number of times.

13. The compiling apparatus according to claim 12, wherein the optimizing means and intermediate representation changing means have a variable identifying a present phase when repeating the same optimization.

14. The compiling apparatus according to claim 12, further comprising a selection switch to determine whether or not an optional one of the optimization functions must be achieved in an optional one of the optimizing phases, the selection switch being externally controlled to stop an optional optimization function in an optional phase.

15. The compiling apparatus according to claim 11, further comprising a selection switch to determine whether or not an optional one of the optimization functions must be achieved in an optional one of the optimizing phases, the selection switch being externally controlled to stop an optional optimization function in an optional phase.

16. The compiling apparatus according to claim 1, wherein a physical memory map structure of main data of the intermediate representations during the intermediate representation changing and optimizing processes is fixed; and thereby the fixed physical memory map structure are commonly used by the intermediate representation changing and optimizing processes.

17. The compiling apparatus according to claim 1, wherein the optimizing structure determination means selects a plurality of optimizing structures, separately carries out optimization according to each of the selected structures, and selects the best optimizing structure among the optimizing structures according to the optimization results.

18. The compiling apparatus according to claim 1, wherein the optimizing means and intermediate representation changing means repeat the same predetermined optimization.

19. The compiling apparatus according to claim 1, further comprising printing means for printing intermediate representations in each phase and a selection switch for activating the printing means, the selection switch being externally controlled to print intermediate representations at optional timing in any one of the phases.

20. A compiling apparatus for compiling a source program in a data processing apparatus, comprising:

a front end transforming a source program into intermediate representations;

optimizing means for optimizing the intermediate representations from the front end in accordance with predetermined optimization functions;

at least one intermediate representation changing means for further transferring the optimized intermediate representations from the optimizing means in accordance with predetermined optimization functions, the at least one intermediate representation changing means including final intermediate representation changing means;

code output means for providing code according to the intermediate representations obtained by the optimization from the file in intermediate representation changing means; and optimizing structure determination means for determining a number of repetitions required for optimization by the optimizing means and intermediate representation changing means, and selecting the optimization functions for directing an optimizing process performed in each of the repetitions, and thereby the intermediate representations being changed and optimized.

21. A compiling method in a data processing apparatus comprising steps of:
- a step for providing intermediate representations described by an intermediate language according to a source program;
- an optimizing structure determination step for determining the number of repetitions of an optimization phase to execute optimization of the intermediate language and selecting optimization functions to direct an optimizing process carried out in each of the optimization phases;
- an optimizing step for optimizing the intermediate representations provided by the source program and the intermediate representations in each of the optimization phases, according to the determination by the optimizing structure determination step;
- an intermediate representation changing step for further transforming the optimized intermediate representation in each of the optimization phases, according to the determination by the optimizing structure determination step;
- a determination step for determining the number of repetitions of an optimization phase; and
- a code output step for providing codes according to the finally obtained intermediate representations.

22. A compiling method according to claim 21, wherein the optimizing structure determination step includes steps of:
- a pick up step for selecting at least one optimization function;
- a classification step for classifying the selected optimization functions into execution classes; and
- a compiler structure determination step for determining the number of times of changing intermediate representations according to the types of intermediate representations and intermediate dependencies, sorting and extracting applicable ones among the optimization functions in each optimization phase, and determining the execution order of the optimization functions according to dependencies of the functions.

* * * * *

UNITED STATES PATENT AND TRADEMARK OFFICE
CERTIFICATE OF CORRECTION

PATENT NO. : 5,396,631
DATED : March 7, 1995
INVENTOR(S) : Masakazu HAYASHI et al.

It is certified that error appears in the above-indentified patent and that said Letters Patent is hereby corrected as shown below:

Column 7, Line 56, delete "10".

Column 11, Line 52, delete "10".

Signed and Sealed this

Twenty-fifth Day of April, 1995

Attest:

BRUCE LEHMAN

Attesting Officer

Commissioner of Patents and Trademarks